Patented July 8, 1941

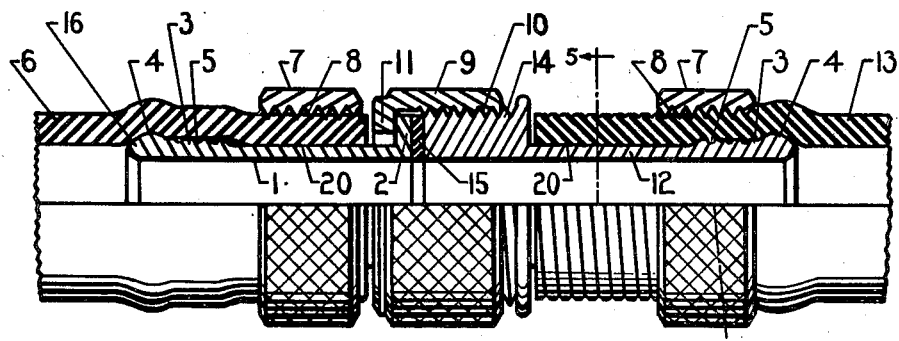
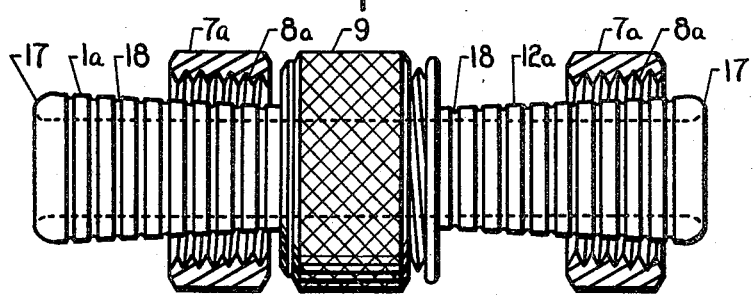
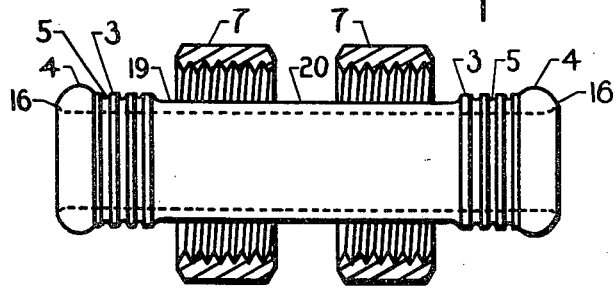
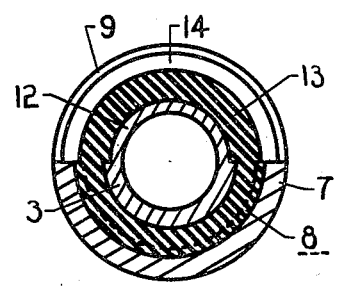
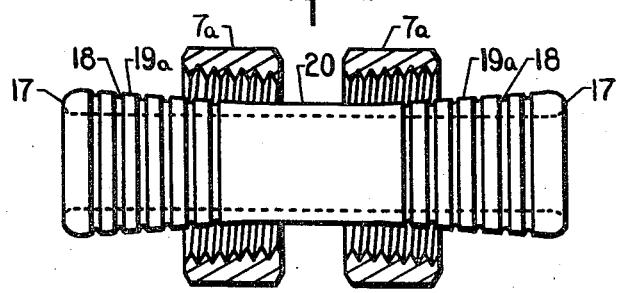

2,248,576

UNITED STATES PATENT OFFICE 2,248,576

HOSE COUPLING

Levi L. McConnohie, Galesburg, Mich.

Application September 13, 1939, Serial No. 294,578

1 Claim. (Cl. 285—84)

The present invention relates broadly to connectors, and in its specific phases to couplings adapted for use on the end of rubber hose.

Several forms of couplings for rubber hose have been placed on the market, but these, in general, have had one or more faults which interfere with their economical and thoroughly satisfactory use. Some of such couplings do not grip the hose sufficiently tight to prevent its being pulled off of the coupling under a moderate pulling tension. Other couplings are made from a plurality of parts which, when once tightened in place, are almost impossible to disassemble, and still others are purposely made so as to be impossible of disassembly, thus requiring the throwing away of the coupling when the hose springs a leak at the end adjacent thereto. Still more complex couplings with loose sliding expansion parts contacting the inner diameter of the hose have also been proposed with little success. The most common type of hose coupling now in use is the one which utilizes a hose clamp formed from sheet metal or wire with radially outward projecting ends through which a stove bolt is placed for tightening purposes. In practice, it has been found that these stove bolts are prone to loosen and permit leaks to start at the coupling. Moreover, there are automatically traveling sprinkler mechanisms now on the market which will follow a guide hose laid lengthwise of the path in which the sprinkling is to take place. Projecting hose clamps at the couplings of the guide hose not infrequently catch and interfere with the proper operation of these mechanisms. It was with these complexities, difficulties, and shortcomings of the present-day hose couplings in mind that the present invention was developed.

Accordingly, among the objects of the present invention is the provision of a hose coupling which is durable, utilizes a minimum of parts, is easy to assemble and disassemble, is of low cost simplified construction, and at the same time is both efficient and serviceable.

A still further object is to provide a hose coupling adapted for the withstanding of high pressures, and particularly a construction wherein high pressure and endwise pulling on the hose both act to still more tightly seal the coupling against leakage.

A still further object is to provide a hose coupling having a ring-sleeve free from inwardly projecting flanges and provided with a continuous internal thread preferably extending from end to end of the ring-sleeve, said ring-sleeve being adapted to threadedly engage the outer face of the hose and when threadedly rotated thereon for sealing purposes to cooperate with a member within the hose to tightly grip the hose therebetween and practically mold same into the threads and grooves of said members so that the end of the hose is firmly held and effectively sealed in place.

Still further objects and advantages of the invention will appear as the description proceeds.

To the accomplishment of the foregoing and related ends, the invention, then, consists of the means hereinafter fully described and particularly pointed out in the claim, the annexted drawing and the following description setting forth in detail certain means for carrying out the invention, such disclosed means illustrating, however, but several of various ways in which the principle of the invention may be used.

In said annexed drawing:

Figure 1 is a partially sectioned assembly view of one form of the present invention illustrating the mode of assembling hose on same.

Figure 2 shows a modified form of the present invention utilizing tapered gripping parts.

Figure 3 shows another form of the present invention wherein a unit inner member with hose receiving ends is used.

Figure 4 illustrates a modification of the coupling assembly shown in Figure 3 and involves the use of tapered parts.

Figure 5 is a full section view of one form of the present invention as taken at a point corresponding with line 5—5 of the assembly shown in Figure 1.

Referring more particularly to Figure 1, one form of the invention utilizes a nipple 1 having an outturned flange 2 at one end and an elongated shoulder 3 and rim 4 at the other end. The rim 4 is preferably of rounded profile which at its maximum diameter is a little larger than the diameter of elongated shoulder 3. The latter is preferably a little larger than the inner diameter of the hose to be connected, and may be provided with grooves 5 to facilitate the sealing of hose 6 thereon by means of ring-sleeve 7 which compresses hose 6 on elongated shoulder 3 to produce a tight seal, as will hereinafter be described in detail. The elongated shoulder 3 is preferably at least as long as half the width of ring-sleeve 7, since this makes possible the complete sealing of the hose on the nipple over a relatively wide area. By the term "ring-sleeve" is meant a member having internal threads 8, and which is free from inner projecting parts such as a flange which would prevent a hose 6, or the like, from being threadedly engaged thereby and passing completely therethrough. The use of a ring-sleeve with internal threads and adapted to permit the hose to pass completely therethrough presents the advantages of permitting a moderately narrow ring-sleeve to be used with reduced frictional drag under tightening conditions, and at the same time where a tapered nipple is used, the taper may be moderate, thus permitting maximum tightening or clamping effect with the ring-sleeve and no danger of loosening under operating conditions. A coupling cap 9 having internal threads 10 and a flange 11, the inner diameter of which is slightly larger than rim 4 to facilitate assembly, is mounted on nipple 1 so that the inner side face of flange 11 will abut outturned flange 2 of nipple 1 with the portion of coupling cap 9 carrying internal threads 10 extending outward to engage the threads on a faucet (not shown) or suitable nipple on the end of another piece of hose 13, or the like. Nipple 12, for instance, is provided at one end with an elongated and enlarged shoulder 14 externally threaded to fit the internal threads 10 of coupling cap 9, or other like threaded end of a coupling. The other end of nipple 12 is preferably provided with a rim 4 and shoulder 3 with grooves 5, said rim and shoulder in preferred construction being of the same size as the corresponding parts on nipple 1 where hose 6 and 13 are of the same inner diameter. The invention, however, is not limited to this particular size of rim and elongated shoulder, since obviously if hose 13 were of a larger or smaller size than hose 6, the size of these parts would be varied a corresponding amount so as to take advantage of the principle set forth in the present invention. Where two pieces of hose, such as 6 and 13, are to be joined, or hose 6 is to be joined to a suitable faucet, a gasket 15 would preferably be placed within coupling cap 9 and adjacent the outer end of outturned flange 2 so that when the connection is tightened, leakage would be avoided.

To assemble the coupling, for instance by joining nipple 1 and hose 6, coupling cap 9 is first slipped into place and then ring-sleeve 7 slipped over nipple 1 and up against flange 11 of coupling cap 9. Point 16 of nipple 1 is then forced into the open end of hose 6 until the end of the hose abuts the outer end of ring-sleeve 7. In preferred construction, with an assembly such as is shown in Figure 1, ring-sleeve 7 is provided with substantially straight internal threads 8, which, for instance, may run eight threads to the inch, although the invention is not limited to this specific number. The inner diameter of the ring-sleeve in preferred size is slightly smaller than the normal outer diameter of hose 6. The outer diameter of the body 20 of nipple 1 between coupling cap 9 and elongated shoulder 3 preferably is approximately the same diameter as the normal inner diameter of the hose 6. Ring-sleeve 7 may then be rotated so as to threadedly engage and screw onto the outer face of rubber composition hose 6, this rotation of ring-sleeve 7 normally continuing until the starting end of enlarged shoulder 3 is reached, whereupon nipple 1 is then forced further into hose 6 and further rotation of ring-sleeve 7 continued. This procedure is carried on until the end of hose 6 is either in contact with the end of flange 11 of coupling cap 9, or closely adjacent thereto. Further rotation of ring-sleeve 7 then carries same over elongated shoulder 3 so as to impact the surface of hose 6 into grooves 5 of elongated shoulder 3 and also into internal threads 8 of ring-sleeve 7, thus giving a tightly sealed joint with ring-sleeve 7 approximately in the same position on the end of hose 6, as is shown in connection with ring-sleeve 7 on the end of hose 13 at the right side of Figure 1. Endwise pulling of hose 6 under these conditions would merely act to still further tighten the seal thereon, since if hose 6 moved to the left after ring-sleeve 7 had been screwed into sealing position on said hose, it would carry ring-sleeve 7 to the left with it whereupon rim 4 on the end of the nipple would act to still further compress the gripped portion of the hose against ring-sleeve 7 and seal same still more tightly against leakage. It is to be noted at this point that internal threads 8 on ring-sleeve 7 act to cut corresponding threads in the outer surface of hose 6 to provide a simple and highly efficient gripping action at the same time as compression of same is being attained. The installation of hose 13 on nipple 12 is accomplished in the same manner as described in connection with the mounting and fastening of hose 6 on nipple 1. For simplicity of understanding the invention, one of the sleeves 7 is shown shortly after starting same on the end of hose 6, while the other sleeve 7 is shown in final sealing position on hose 13. In actual condition for use, both of the ring-sleeves 7 would be rotated so as to threadedly engage and grip the corresponding hose above elongated shoulder 3. The nipples, ring-sleeves, and coupling cap may be made of iron, steel, brass, hard die casting alloys, or other metallic alloy adapted for this type of service.

A modified construction of the hose coupling of Figure 1 is shown in Figure 2. Here, for use with the same size hose as 6 and 13, nipples 1a and 12a are tapered so as to have approximately the same diameter at their outer ends 17 as rim 4 shown in Figure 1, while the small outer diameter of nipples 1a and 12a is approximately the same as the smallest outer diameter or body 20 of nipples 1 and 12 shown in Figure 1. Both of the tapered nipples are preferably provided with circumferential grooves 18, or the equivalent, to aid in gripping the inner face of a suitable hose (not shown) placed thereon for coupling purposes as described. With tapered nipples, ring-sleeves 7a are preferably taper threaded at approximately the same taper angle. When these ring-sleeves are placed on the tapered nipples, they are mounted in inverse position to each other so as to correspond with the taper of the respective nipples on which they are mounted. The sealing of the hose on nipple 1a or 12a is accomplished by shoving the end of a corresponding nipple into the bore of the hose until the latter presses against the end of ring-sleeve 7a, rotating ring-sleeve 7a a few turns to threadedly engage the end of the hose, then shoving the hose further onto the nipple, and again rotating sleeve 7a further onto the end of the hose, this procedure being followed until the end of the hose is in desired position on the nipple, following which rotation of the ring-sleeve 7a toward outer end 17 of the corresponding nipple will act to give a tighter and tighter grip on the hose and imbed same into grooves 18 of the nipple, as well as into the threads 8a of the ring-sleeve being rotated.

Where it is merely desired to splice two pieces of hose together, or repair a leak by cutting out a section of hose without making a gasketed readily separable connection at that point, the three-piece coupling members of Figure 3 or 4 may be utilized. The coupling of Figure 3, for instance, uses a one-piece nipple 19 which has on each end thereof a rim 4, and elongated shoulder 3 carrying grooves 5. Ring-sleeves 7 are used therewith to grip the ends of the two pieces of hose (not shown) on nipple 19 in the manner described in connection with Figure 1. In preferred construction, when the assembly is completed, the adjacent ends of the two pieces of hose are preferably at a point approximately midway between the ends of nipple 19. The three-piece coupling of Figure 4 is usable in similar manner to that of Figure 3. Nipple 19a is preferably provided with an outer diameter at its midpoint approximately the same as the inner diameter of the hose to be connected. From this outer diameter, nipple 19a gradually tapers outwardly to outer ends 17. The face of each of these tapered portions is preferably provided with circumferential grooves 18, or the equivalent, as hereinbefore set forth. With this construction, correspondingly tapered ring-sleeves 7a are preferably used and act to seal the ends of the hose on nipple 19a in the same manner as has been described in connection with Figure 2.

Other modes of applying the principle of my invention may be employed instead of those explained, change being made as regards the article herein disclosed, provided the means stated by the following claim or the equivalent of such stated means be employed.

I therefore particularly point out and distinctly claim as my invention:

In a separable hose coupling, a nipple element, an outturned end flange thereon forming a shoulder adapted to abut the end of a hose, said nipple having a smooth cylindrical portion of substantial length extending from said flange, an annularly ridged cylindrical surface on the nipple outwardly of said smooth cylindrical portion, an annularly enlarged rim outwardly of said ridged portion at the outer terminal end of said nipple, and a ring-sleeve of sufficient size to receive the end of the hose when in abutting relation to said flange and adapted to be moved toward the outer end of said nipple element whereby the hose is clamped between the ridged cylindrical portion and rim of said nipple element and said ring-sleeve.

LEVI L. McCONNOHIE.